(12) United States Patent
Miao et al.

(10) Patent No.: US 6,279,022 B1
(45) Date of Patent: Aug. 21, 2001

(54) SYSTEM AND METHOD FOR DETECTING SYMBOL BOUNDARY IN MULTI-CARRIER TRANSMISSION SYSTEMS

(75) Inventors: Zhouhui Miao, Sunnyvale; Meng-Chieh Tsao, Santa Clara; Steve Chen, San Jose; Ming-Kang Liu, Cupertino, all of CA (US)

(73) Assignee: Integrated Telecom Express, Inc., San Jose, CA (US)

( * ) Notice: Subject to any disclaimer, the term of this patent is extended or adjusted under 35 U.S.C. 154(b) by 0 days.

(21) Appl. No.: 09/191,146

(22) Filed: Nov. 13, 1998

(51) Int. Cl.[7] ............................................ G06F 17/14
(52) U.S. Cl. ................................................. 708/404
(58) Field of Search ............................ 708/400, 403–404; 375/219–221

(56) References Cited

U.S. PATENT DOCUMENTS

| | | | |
|---|---|---|---|
| 5,400,322 * | 3/1995 | Hunt et al. | 370/19 |
| 5,479,447 * | 12/1995 | Chow et al. | 375/260 |
| 5,519,731 * | 5/1996 | Cioffi | 375/260 |
| 5,557,612 * | 9/1996 | Bingham | 370/71 |
| 5,596,604 * | 1/1997 | Cioffi et al. | 375/260 |
| 6,058,121 * | 5/2000 | Kim et al. | 708/404 |

* cited by examiner

Primary Examiner—Tan V. Mai
(74) Attorney, Agent, or Firm—Law +

(57) ABSTRACT

Frame synchronization between Asymmetric Digital Subscriber Line (ADSL) transceivers operating using Discrete Multi-tone (DMT) line code is effectuated by boundary detection logic executing a rapid, computationally simple correlation process. The invention is particularly suited for ADSL software modem implementations, where conservation of computing resources is especially critical, and loss of synchronization can lead to significant unrecoverable data errors.

36 Claims, 2 Drawing Sheets

SYSTEM AND METHOD FOR DETECTING SYMBOL BOUNDARY IN MULTI-CARRIER TRANSMISSION SYSTEMS

FIELD OF THE INVENTION

The invention relates generally to high-speed synchronous data transmission systems that use multiple signal carriers, such as those operating over Digital Subscriber Lines (DSL). More particularly, the present invention is directed to symbol boundary synchronization between ADSL transceivers using the Discrete Multi-tone (DMT) line code, where a DMT symbol is a superposition of a certain number of modulated carriers over a fixed interval for transmitting a certain number of information bits.

BACKGROUND OF THE INVENTION

Multi-carrier modulation is well-known in the art, and is described at length in a number of patents assigned to Amati, including U.S. Pat. Nos. 5,400,322, 5,479,447, 5,557,612, 5,519,731, and 5,596,604 to name a few. A popular line code implemented today for ADSL is based on modulating N separate sub-carriers within a particular usable frequency band of a transmission channel, in this case a digital subscriber line. A set of N sub-carriers (N=256 in a case of a T1.413 issue 2 compliant device, and some sub-set of this number in the currently proposed G.992-1 and G.992-2 standards) are individually configured with bit and energy loading according to the received SNR measured during an initialization or hand shaking procedure between an upstream (CO side) and downstream (CPE side) transceiver. The sub-carriers are then modulated according to the transmitted data and the assigned bit loading. In general, during a pre-defined interval called the symbol interval, each sub-carrier is quadrature-amplitude modulated (QAM) and the transmitted output is a superposition of all the modulated sub-carriers. In the case of T1.413 and G.992-x standards, a DMT symbol period is approximately 250 $\mu$sec.

To maintain synchronization between the upstream and downstream transceivers, a variety of synchronization mechanisms are required. First, to maintain sampling clock synchronization (i.e. to make sure that the clock that operates the A/D and D/A at the CO side is the same as that at the CPE side), a pilot tone is generally dedicated and transmitted by the upstream transceiver. Second, when the received signal is sampled by the recovered clock, a correct set of samples corresponding to one transmitted symbol needs to be collected for subsequent demodulation. This process is called symbol boundary detection. Since each symbol is used to carry a certain number (B) of bits which form a data frame, a DMT symbol when viewed as an information bit stream is also called a frame. It is common to form M frames as a superframe. The purpose is to assign the same byte location in each frame for different types of overhead bytes. With the recognition of the superframe boundary, each overhead byte can be detected properly. Therefore, a third type of synchronization maintains superframe synchronization. In ADSL standards, a superframe consists of 68 data frames and one synchronization frame, which is a fixed pattern for superframe synchronization.

It is extremely important that the linked transceivers efficiently and reliably detect the correct received symbol boundary for subsequent demodulation. In general, this boundary detection needs to be done very early during the initialization or handshaking phase of the connection. With this task achieved, all further information changed via the DMT symbols can be processed.

A prior art proposal for achieving the symbol boundary during the initialization procedure in an ADSL system is performed as follows: (1) a fixed pattern, periodic, and time-domain signal x(t) (having an FFT X[n] as its frequency domain signal) is transmitted; (2) the received signal y(t) is sampled at the same clock (assuming the sampling clock is recovered) and an FFT is used to transform the time domain samples into frequency domain data Y[n]; (3) since X[n] is known, a ratio Z[n] =Y[n]/X[n] can be calculated, where Z[n] represents the channel transfer function; since y(t) is also periodic, Y[n] can have a phase shift if a different set of y(t) samples is used to compute Y[n];(4) a channel impulse response h[i] is then calculated, by taking an inverse FFT of Z[n]; note that if there is a time shift in collecting y(t) samples, there is a cyclic shift of h[i]; (5) the squares ($h[i]^2$) are summed over a cyclic range of 1+v, where v is a predefined cyclic prefix length; a cyclic prefix is a repetition of the last v samples a DMT symbol and appended to the beginning of the symbol; this cyclic prefix is a useful technique to reduce intersymbol interference and is used after the symbol boundary is detected; (6) the beginning of the cyclic range which maximizes the sum corresponds to the symbol boundary and is detected as such. For T1.413 (as well as G.992-1 and G.992-2), note that X[n] is a specified complex sequence with a value equal to $\pm 1 \pm j$. Accordingly, the square of its magnitude is always equal to 2. In actual practice, steps (2) and (3) are executed first to estimate the channel transfer function. A computation is then performed to insert an additional time domain equalizer (called the TEQ filter in ADSL) before the FFT input. The above steps (2) and (3) are then performed again to yield a combined channel and equalizer transfer function.

While the above algorithm is sufficient for many purposes, it has certain characteristics that make it undesirable for some applications. In particular, the computational complexity of the above approach is rather high. This is caused by the fact that a division operation must be performed, as noted in step (3). These types of calculations require more processing time from a signal processing unit and more latency time to establish the boundary synchronization. The drawbacks of such approach are even more apparent in the so-called "soft modem" applications, where processing power is at a premium because it is shared among many other competing agents.

SUMMARY OF THE INVENTION

An object of the present invention, therefore, is to provide a system and method for detecting the boundary of multi-tone symbols transmitted between a pair of transceivers in a rapid but computationally simple manner;

A related object of the present invention is to provide a system and method for performing the initialization procedure in a T1.413 compatible ADSL transmission system which is faster and more efficient than prior art techniques, and, because of such characteristics, further minimizes potential data errors and maximizes throughput in such a system;

Another object of the present invention is to provide a system and method for detecting a boundary of a received DMT data symbol even in cases where SNR is low in a channel carrying such data symbol.

A further object of the present invention is to provide a DMT software modem that utilizes a fast but relatively low computation complexity method for detecting symbol boundaries.

A system of the present invention therefore quickly and accurately detects boundaries of a data symbol, which, in a preferred embodiment, is a DMT symbol complying with applicable ADSL protocol standards. This symbol is received as a first time domain signal through a data channel from another data transceiver. The data symbol is preferably transmitting during a training (or fast re-train) procedure, and has a known frequency transform. After the signal is received, a fourier transform circuit converts the first time domain signal to a first frequency transform. In a preferred embodiment, the transform circuit is implemented by a microprocessor executing a fourier transform routine within a host computing system as part of a software modem. The result is then passed on to boundary detection circuit, which, again, in a preferred embodiment is software logic implemented as part of the aforementioned software modem. The boundary detection circuit includes individual software routines for first calculating a correlation function based on multiplying the first frequency transform and a complex conjugate of the known frequency transform. The complex conjugate is used at this stage of the calculation, because doing so results in a significant time saving compared to using the normal known frequency transform. This is due to the fact that using the latter would require a division operation, which, in environments where computation resources are scarce, can take an inordinate amount of time. Thus, in a preferred embodiment of the present invention, division operations are entirely eliminated. Thereafter, a boundary detection function is calculated by the boundary detection circuit by computing said the correlation function over a predetermined time period. Again, in a preferred embodiment, the predetermined time period corresponds to a time approximately equal to a time required for transmitting a cyclic prefix for the data symbol. When the value of the boundary detection function (in this case, a sum of the squares of the channel impulse function) is maximized for such window of time, this window can then be used to identify the start of the boundary of the data symbol.

An alternative implementation of the present invention can take the form of a conventional software routine/program which is loaded and executed on a host computing system as part of a software modem. Alternatively, such program could be implemented as a semiconductor hard programmed ROM or the like. In any event, so long as sufficient signal processing capability is available, such program can be configured to interact with a data transceiver in accordance with the teachings herein.

A preferred method of detecting a boundary of a data symbol is accordingly accomplished using the general procedure described in connection with the preferred system embodiment above.

Preliminary results suggest that the present invention produces a noticeable time reduction performance over the prior art. The fact that the computation time for detecting the symbol boundary is relatively small compared to a computation time used for measuring characteristics of the reference time domain signal yields another beneficial side effect. In particular, because the reference time domain signal can be studied over longer periods, the present invention yields better accuracy and signal demodulation performance.

Although the inventions are described below in a preferred embodiment involving an ADSL transceiver, it will be apparent to those skilled in the art the present invention would be beneficially used in many environments where it is necessary to provide quick and accurate detection of boundaries for FFT modulated data frames.

DETAILED DESCRIPTION OF THE INVENTION

Figure 1:
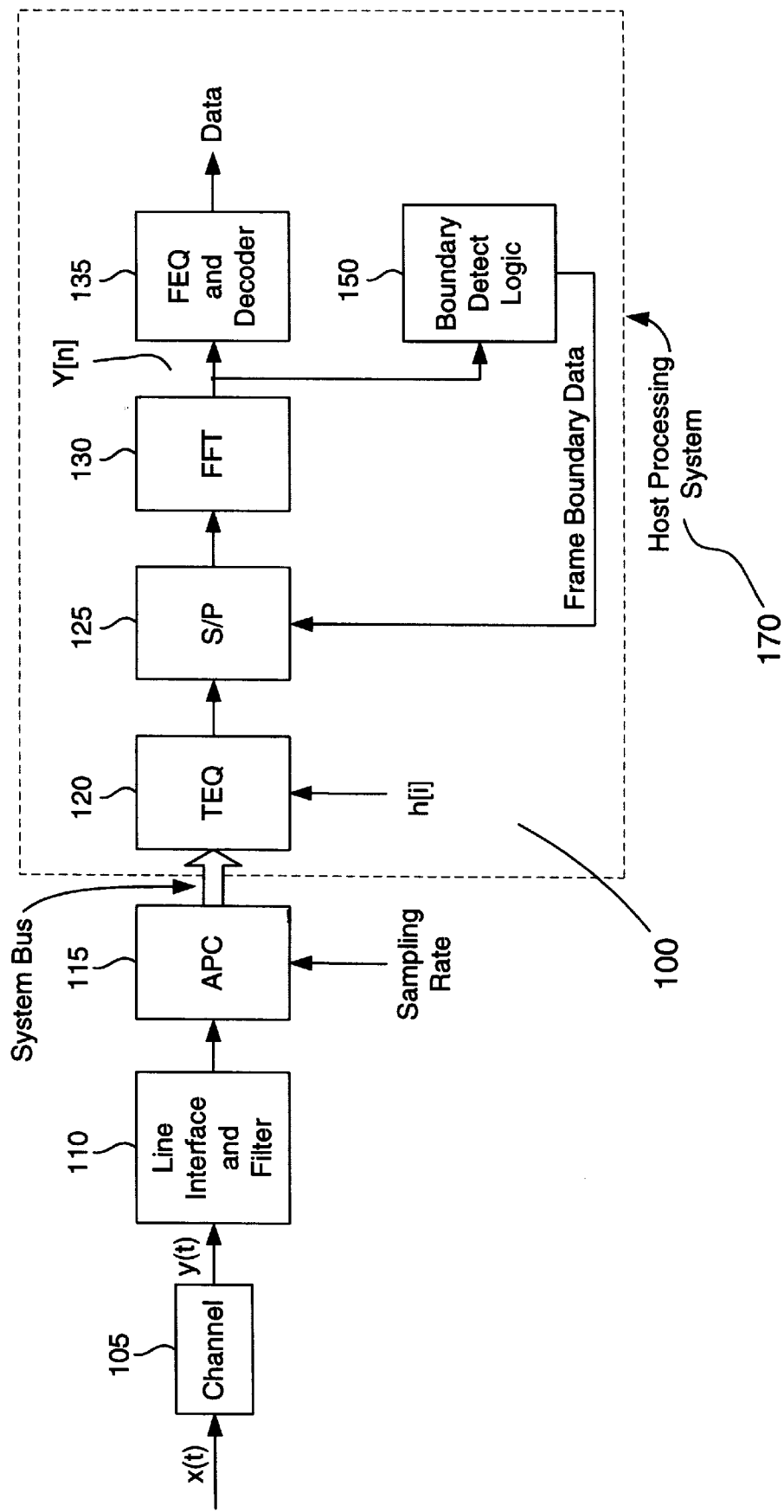
FIG. 1 is a block diagram illustrating an embodiment of a system implemented in accordance with the teachings of the present invention.

A preferred embodiment of a system 100 of the present invention is illustrated in FIG. 1. With the exception of some of the details of the boundary detection logic used in the present system, the other components shown in FIG. 1 are well-known ADSL transceiver circuits, and hence will not be explained in detail herein. As mentioned earlier, during an initialization procedure between two linked ADSL transceivers, a training process is initiated at one phase by the upstream transceiver (not shown) transmitting a signal x(t) having a known FFT X[n] through a channel 105. The latter channel is made of a regular copper wire and may have differing electrical properties, transmission lengths (sizes), varying attenuation characteristics, and a number of impairments or interferences. After passing through channel 105, a signal y(t) is received by a Line Interface and Filter circuit 110. In the case of ADSL, the Line Interface and Filter circuit includes sub-circuitry for separating a DMT signal from a lower end 4 kHz POTS analog signal, as well as sub-circuits having conventional transformers and isolation circuitry used in a wide variety of high-speed devices interfacing to standard telephone lines. An Analog to Digital Converter circuit 115 uses a recovered sampling clock determined by the nature of the ADSL signal received (which may vary depending on whether the transceiver is a full rate or scaled rate implementation) to convert the received ADSL signal to a series of digital samples. These samples are transmitted to a Time Domain Equalizer (TEQ) 120, which is an FIR (finite impulse response) filter configured with channel feedback information so that the combined impulse response has a minimum length to avoid intersymbol interference between adjacent ADSL symbols. After passing through the Time Domain Equalizer (TEQ) circuit 120, the samples are converted into a parallel form and stored in a buffer within a Serial/Parallel converter 125. This serial to parallel conversion requires an input from the Boundary Detect Logic 150 to partition serial input into blocks for FFT input. A Fast Fourier Transform (FFT) circuit 130 then demodulates the digital time samples, resulting in frequency domain values Y[n]. These values are then passed through a frequency domain equalizer (FEQ) 135 and decoded into a recovered serial data stream.

While FFT 130 and FEQ 135 are shown coupled closely to the front end stages of a receiving portion of transceiver 100, they may be implemented in either a dedicated hardware implementation, or, in a preferred embodiment, within a host computing system 170 as part of a "software" modem as noted by the dashed lines in FIG. 1. The present invention can be included within any software modem when host processing computational capability is sufficient to reduce hardware complexity and to provide programming flexibility as various transmission protocol standards evolve. In such software modem applications, the "front end" of a transceiver 100 is closely coupled to a telephone line interface, but TEQ 120, S/P 125, and FFT 130 may be done in either software or hardware, and the FEQ is performed by a separate host processing device (i.e., such as a microprocessor with sufficient computing capability) within a computing system using various executable microcode and software routines stored in memory sub-systems of such system 170. Most importantly as concerns the present invention, host processing system 170 further includes suitable various executable microcode and software routines 150 for performing symbol boundary detection in an ADSL data transmission environment, using a process described in more detail below in connection with FIG. 2.

Figure 2:
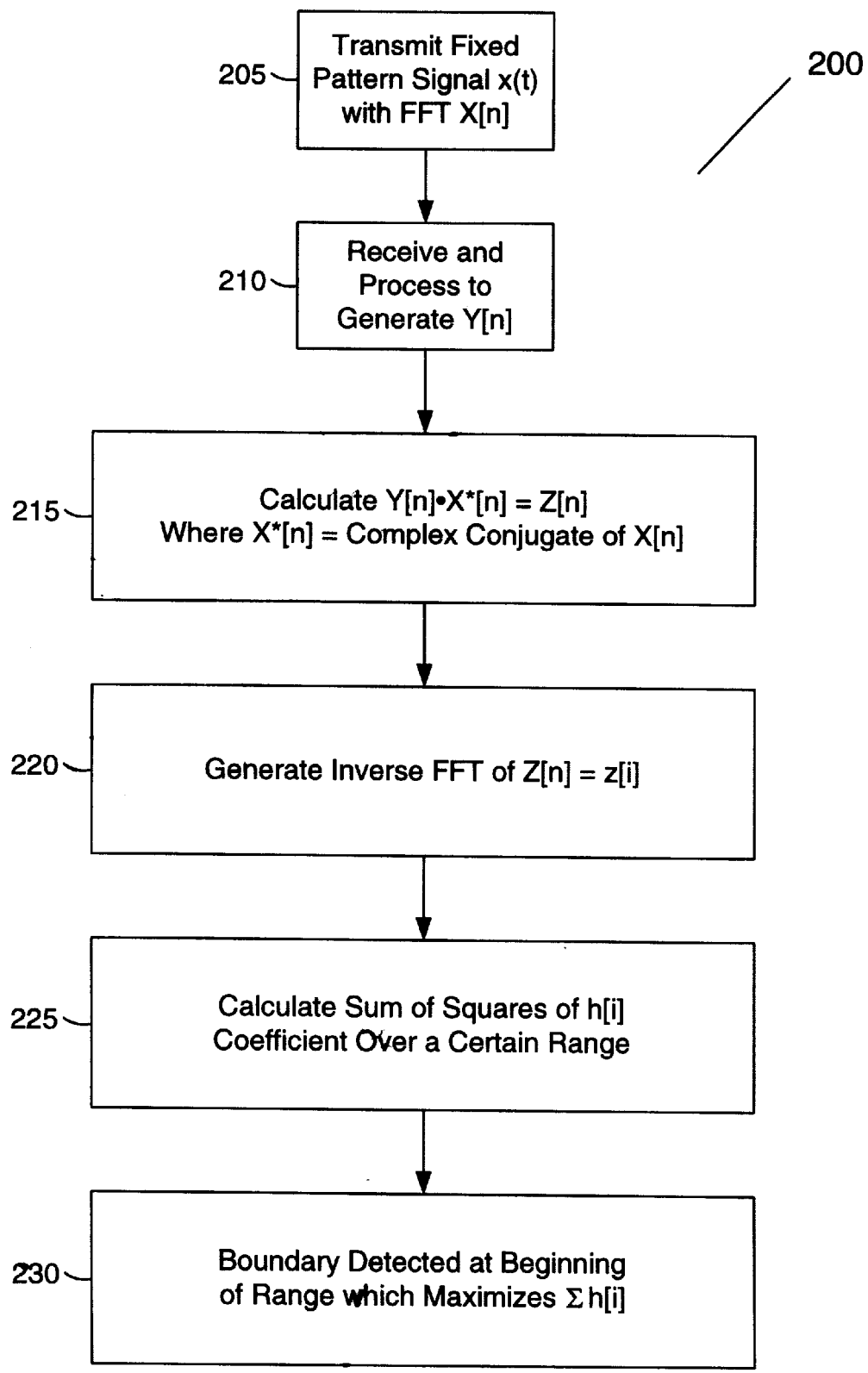
FIG. 2 depicts in flow chart form the general method of operation of the system noted in FIG. 1.

FIG. 2 is a flow chart form of a preferred ADSL symbol boundary detection process 200 of the present invention. As noted above, prior to establishing a full data transmissions link, two ADSL transceivers must first complete a predefined initialization procedure such as documented in T1.413, G.992-1, and G.992-2 standards. At step 205, during the initialization phase, one transmitter transmits a signal x(t) (which has a known FFF X[n]) for synchronizing and training TEQ 120 within transceiver 100. This time domain signal is received in a form y(t) and converted at step 210 by FFT 130 resulting in a set of frequency samples Y[n]. FFT 130 can be implemented in either hardware or software form on a transceiver 100, such as by dedicated hardware logic, or by a DSP associated with the transceiver and operating to run an executable routine stored in an associated memory. In a software modem implementation, of course, this FFT operation is performed by a host processing device within a computing system using a computer program configured to perform an FFT operation. Such DSP routines and computer programs are well-known in the art, and therefore are not explained in detail herein. Next, at step 220, Boundary Detect Logic 150 calculates a channel response function $Z[n]=Y[n] * X^*[n]$, where $X^*[n]$ is a previously computed and pre-stored complex conjugate of known FFT X[n]. Notably, this multiplication step can be performed extremely rapidly by a conventional microprocessor, unlike the prior art division operation (noted above) which normally takes place at this stage of the initialization procedure. In step 220, an inverse FFT z[i] of Z[n] is generated by Boundary Detect Logic 150. This function in fact corresponds to a correlation function between x[i] and y[i], and can be considered therefore as a maximum correlation detection (MCD) operation. At this point, since X[n] is $=\pm 1 \pm j$, it is apparent that $Y[n]/X[n]=Y[n]X^*[n]/2$. In other words, z[i], as calculated by the present method, is the same as h[i] generated in the prior art method, except with the difference of a simple constant numerical factor. Accordingly, at this point of the process, h[i] is also known, and at step 225, a boundary detection function is calculated from these values being squared and then summed over a pre-defined cyclic range. For example, if the FFT point size is N, the number of Z[n] samples is N. If the cyclic prefix length is v, the square sum of h[I] is calculated over a range of v and cyclic over N. At step 230, a symbol "boundary" is detected as the beginning of the range (with length v) that maximizes the square sum. Again, in a software modem implementation, of course, all of the above boundary detect logic operations are performed by a host processing device using a computer program or routine appropriately configured to execute the process indicated in FIG. 2.

In another embodiment, boundary detection logic 150 can be implemented as with FFT 130 in a transceiver (i.e., through dedicated hardware or using a DSP and appropriate executable routines). Again, it will be apparent to one skilled in the art to know how to configure such machine executable routines or programs to perform such operations, and therefore such specific implementation details are not explained herein.

It should be noted that, in the case of an ADSL implementation, the predetermined range at step 225 is equal to v+1, where v is the cyclic prefix length. In brief, the mean square calculation gives the "window" for the DMT signal to pass through. By maximizing the size of the window, the particular DMT symbol can be received with maximum energy. On the other hand, the sum of the squares of h[i]'s that are outside the range represents the energy of adjacent DMT symbols that can pass through. As a result, by minimizing the square sum of h[i]'s outside the window, the ISI is minimized.

The above system and method, therefore, permits synchronization between linked ADSL transceivers to be achieved rapidly, and through computationally simple operations. By eliminating all division operations during the boundary detection process, this procedure can be effectuated much more quickly than with prior art schemes. This makes the present invention extremely attractive for use in software modem applications where processing devices performing DMT demodulation and channel servicing must devote as little time as possible for such operations to avoid constraining other I/O and data processing operations within a host computing system.

Another advantage, is that as the computation complexity is reduced, less time is required for the detection process, and therefore more time can be allocated for the received signal y[i] measurement, which in practice is corrupted by noise. Since y[i] is periodic, it can be averaged over the periodic samples to suppress the noise. With more time allocated for measuring y[i], more received samples can be measured, which leads to better accuracy. For example, the better y[i] is determined, the better the channel impulse response can be determined, and, in turn, TEQ 120 can be more accurately trained to offset such impulse effects. Thus, in general, in the present invention, a computation time allotted for detecting the symbol boundary can be advantageously kept relatively small (i.e. on the order of 50 symbols or so) compared to a computation time used for measuring characteristics of the training signal.

Furthermore, by correctly detecting the symbol boundary using the present method that minimizes the ISI, an ADSL transmission system minimizes potential data errors and maximizes data throughput.

Although the present invention has been described in terms of a preferred embodiment, it will be apparent to those skilled in the art that many alterations and modifications may be made to such embodiments without departing from the teachings of the present invention. For example, it should be noted that typically, demodulating portions of transceiver 100 (i.e., TEQ 120, S/P 125, FFT 130, FEQ 135 and Boundary Detect Logic 150) and a front end portion of transceiver 100 (i.e., Line Interface and Filter 110 and ADC 115) are coupled through a system bus (in a preferred embodiment, a PCI bus) to each other by appropriate interface logic (not shown). Other combinations are of course possible, and in some applications it may be desirable to "move" functionality performed in other hardware circuits within a front end portion of transceiver 100 into software implementations performed by host processing system 170, and vice-versa. Finally, it will be apparent to those skilled in the art that for purposes of the present discussion, the block diagram of the present invention has been simplified. Other circuits, including data transmission portions of transceiver 100, analog and digital support logic, and bus interface portions to host processing system 170 are well-known in the art, and are omitted here as they are not material to the present teachings. The microcode and software routines executed by a processor to effectuate the inventive method may be embodied in various forms, including in a permanent magnetic media, a non-volatile ROM, a CD-ROM, or any other suitable machine-readable format. Accordingly, it is intended that the all such alterations and modifications be included within the scope and spirit of the invention as defined by the following claims.

What is claimed is:

1. A system for detecting a boundary of a data symbol received as a first time domain signal through a data channel from a data transceiver, which data symbol has a known frequency transform, said system comprising:
   a Fourier transform circuit which converts said first time domain signal to a first frequency transform; and
   a boundary detection circuit which can:
      i) calculate a correlation function based on multiplying said first frequency transform and a complex conjugate of the known frequency transform;
      ii) perform inverse Fourier transfer function for the computed correlation in the frequency domain;
      iii) calculate a boundary detection function by computing said inverse Fourier transform of the correlation function over a predetermined time period; and
      iv) determine the boundary of the data symbol by monitoring a value of said boundary detection function over said predetermined time period.

2. The system of claim 1, wherein said conversion of the first time domain signal to said first frequency transform is performed by a program routine executed by a host processing device within a computing system.

3. The system of claim 2, wherein said correlation function, said inverse Fourier transform, said boundary detection function, and said starting boundary are also calculated by said host processing device.

4. The system of claim 1, wherein said system, including said Fourier transform circuit and said boundary detection circuit, is implemented within a computing system by a host processing device executing a software routine stored in said computing system.

5. The system of claim 1, wherein said correlation function is a series of coefficient values $z[i]$ resulting from an inverse fast Fourier transform performed on a series of coefficients $Z[n]$, which coefficients $Z[n]$ are calculated by multiplying a series of coefficients $Y[n]$ from said first frequency transform and a series of coefficients $X^*[n]$ from said complex conjugate of the known frequency transform.

6. The system of claim 5, wherein said coefficients $Y[n]$ is the fast Fourier transform of coefficients $y[n]$ received from the channel.

7. The system of claim 5, where said coefficients $y[n]$ are time averaged over the period of $y[n]$ for P periods (P>50) from the received samples $y[n]$.

8. The system of claim 5, wherein said boundary detection function is based on computing a sum of squares of said values $z[i]$.

9. The system of claim 6, wherein said predetermined time period corresponds to a time approximately equal to a time required for transmitting a cyclic prefix for said data symbol.

10. The system of claim 6, wherein said starting boundary of the data symbol is determined by detecting a time range when said value of said boundary detection function is maximized.

11. The system of claim 1, wherein said data symbol is a discrete multi-tone (DMT) symbol received during an initialization procedure initiated between an upstream transceiver and a downstream transceiver.

12. The system of claim 1, wherein said data symbol is a discrete multi-tone (DMT) symbol received during an fast retrain procedure initiated between an upstream transceiver and a downstream transceiver.

13. The system of claim 1, wherein when said data symbol is a discrete multi-tone (DMT) symbol consisting of N separate tones, where N>90, and said symbol is transmitted with a symbol period of 250 $\mu$sec, said symbol boundary can be detected by said boundary detect circuit at least two times faster than said boundary detection circuit based on dividing said first frequency transform by said known frequency transform.

14. The system of claim 1, wherein said system is incorporated as part of a transceiver compatible with ADSL protocols specified in any of the T1.413, G.992-1 and G.992-2 standards.

15. A machine executable program for detecting a boundary of a data symbol received as a first time domain signal through a data channel by a data transceiver, which data symbol has a known frequency transform, said program comprising:
   a first routine for converting said first time domain signal to a first frequency transform; and
   a second routine which can:
      i) calculate a correlation function based on multiplying said first frequency transform and a complex conjugate of the known frequency transform;
      ii) perform inverse Fourier transfer function for the computed correlation in the frequency domain;
      ii) calculate a boundary detection function by computing said inverse Fourier transform of said correlation function over a predetermined time period;
      and iii) determine the boundary of the data symbol by monitoring a value of said boundary detection function over said predetermined time period.

16. The program of claim 15, wherein said program is executed entirely within a computing system by a host processing device.

17. The program of claim 15, wherein said first routine is executed by a digital signal processing circuit associated with said data transceiver.

18. The program of claim 17, wherein said second routine is also executed by a digital signal processing circuit associated with said data transceiver.

19. The program of claim 17, wherein said program also generates a series of coefficient values $z[i]$ by performing an inverse fast Fourier transform on a series of coefficients $Z[n]$, which coefficients $Z[n]$ are obtained by multiplying a series of coefficients $Y[n]$ from said first frequency transform and a series of coefficients $X^*[n]$ from said complex conjugate of the known frequency transform.

20. The system of claim 19, wherein said coefficients $Y[n]$ is the fast Fourier transform of coefficients $y[n]$ received from the channel.

21. The system of claim 19, where said coefficients $y[n]$ are time averaged over the period of $y[n]$ for P periods (P>50) from the received samples $y'[n]$.

22. The program of claim 19, wherein said boundary is detected based on computing a sum of squares of said values $z[i]$.

23. A method of detecting a boundary of a data symbol, which data symbol has a known frequency transform, said method comprising the steps of:
   (a) receiving a first time domain signal through a data channel from a data transceiver; and
   (b) converting said first time domain signal to a first frequency transform; and
   (c) computing a correlation function based on multiplying said first frequency transform and a complex conjugate of the known frequency transform; and
   (d) converting said correlation function to said first inverse Fourier transform; and
   (e) computing a boundary detection function by computing said correlation function over a predetermined time period; and (f) determining the boundary of the data symbol by monitoring a value of said boundary detection function over said predetermined time period.

24. The method of claim 23, wherein said conversion of the first time domain signal to said first frequency transform during step (b) is performed by a host processing device within a computing system.

25. The method of claim 24, wherein any computations during said steps (c), (d) (e), and (f) are also performed by said host processing device.

26. The method of claim 23, wherein said method is effectuated entirely by a host processing device executing a software routine stored in said computing system.

27. The method of claim 23, wherein during step (c) a series of coefficient values $z[i]$ are generated by performing an inverse fast Fourier transform on a series of coefficients $Z[n]$; and further including a step prior to step (c) during which said coefficients $Z[n]$ are calculated by multiplying a series of coefficients $Y[n]$ from said first frequency transform and a series of coefficients $X^*[n]$ from said complex conjugate of the known frequency transform.

28. The system of claim 27, wherein said coefficients $Y[n]$ is the fast Fourier transform of coefficients $y[n]$ received from the channel.

29. The system of claim 27, where said coefficients $y[n]$ are time averaged over the period of $y[n]$ for P periods (P>50) from the received samples $y'[n]$.

30. The method of claim 27, wherein said boundary is detected based on computing a sum of squares of said values $z[i]$.

31. The method of claim 23, wherein said predetermined time period corresponds to a time approximately equal to a time required for transmitting a cyclic prefix for said data symbol.

32. The method of claim 31, wherein said boundary of the data symbol is determined by detecting a time range when said value of said boundary detection function is maximized.

33. The method of claim 23, wherein said data symbol is a discrete multi-tone (DMT) symbol received during an initialization procedure initiated between an upstream transceiver and a downstream transceiver.

34. The method of claim 23, wherein said data symbol is a discrete multi-tone (DMT) symbol received during an fast retrain procedure initiated between an upstream transceiver and a downstream transceiver.

35. The method of claim 23, wherein when said data symbol is a discrete multi-tone (DMT) symbol consisting of N separate tones, where N>90, and said symbol is transmitted with a symbol period of 250 $\mu$sec, said symbol boundary can be detected by said boundary detect circuit at least two times faster than said boundary detection circuit can determine said boundary using a correlation function based on dividing said first frequency transform and said known frequency transform.

36. The method of claim 23, wherein a computation time for detecting said symbol boundary is relatively small compared to a computation time used for measuring characteristics of said first time domain signal.

\* \* \* \* \*